United States Patent [19]
Perschy

[11] 3,934,131
[45] Jan. 20, 1976

[54] OUTPUT CONTROLLER FOR INITIATING DELAYED OR CONDITIONAL COMMANDS VIA A GENERAL PURPOSE COMPUTER

[75] Inventor: James A. Perschy, Laurel, Md.

[73] Assignee: The Unites States of America as represented by the Secretary of the Navy, Washington, D.C.

[22] Filed: Jan. 6, 1975

[21] Appl. No.: 538,657

[52] U.S. Cl. ..................... 235/153 A; 235/153 AC; 235/153 AH; 340/146.1 BA; 340/146.1 D; 340/172.5
[51] Int. Cl.² ........................................ G06F 11/00
[58] Field of Search .. 235/153 A, 153 AC, 153 AH; 325/41, 42; 340/146.1 BA, 146.1 D; 445/1

[56] References Cited
UNITED STATES PATENTS

| | | | |
|---|---|---|---|
| 3,199,077 | 8/1965 | Prather | 235/153 AH |
| 3,838,261 | 9/1974 | Rice et al. | 235/153 AC |

Primary Examiner—R. Stephen Dildine, Jr.

[57] ABSTRACT

The proposed command controller responds to the true or desired command data pattern and its complement which are outputted from the computer interlaced in time and checks these true-complement patterns to determine if a command format error exists. Moreover, the command pattern is checked for timing errors by comparing it against preselected minimum and maximum delay intervals corresponding to the permissible minimum and maximum time intervals for a command signal output. If the command format or its timing is incorrect, an error flag is fed back to the computer to initiate an interrupt and/or to trigger a back-up mode. The invention facilitates the use of high speed general purpose computer machines as real time, hands off, control devices for certain applications such as onboard a spacecraft or within medical electronics systems, for example.

6 Claims, 3 Drawing Figures

3,934,131

OUTPUT CONTROLLER FOR INITIATING DELAYED OR CONDITIONAL COMMANDS VIA A GENERAL PURPOSE COMPUTER

BACKGROUND OF THE INVENTION

Because of the extreme flexibility and high put-through capability of a high speed general purpose computer, there has been significant reluctance to accept such computers as real time, hands off, control devices. This reluctance stems primarily from the fear that undesired commands might be initiated by the computer.

SUMMARY OF THE INVENTION

In order to overcome this reluctance and to increase the utility of general purpose digital computers as remote control devices capable of effectuating delayed or conditional commands, the proposed output controller of the present invention has been conceived.

As will be pointed out in more detail hereinafter, the output controller of the present invention provides apparatus which combines true-complement discrimination (parity check on a bit-by-bit basis) and time discrimination, to guarantee that a general purpose computer does not execute undesired commands. If either type of error is detected, the apparatus of the present invention generates an error flag feedback signal which is applied to the computer to initiate either an interrupt and/or a back-up mode of operation.

A primary object of the present invention is thus to enhance the utility and acceptability of the computer as a real time, automatic control device wherein the possibility of initiating undesired commands is minimized.

Other objects, purposes and characteristic features of the present invention will in part be pointed out as the description of the invention progresses and in part be obvious from the accompanying drawings, wherein.

Figure 1:
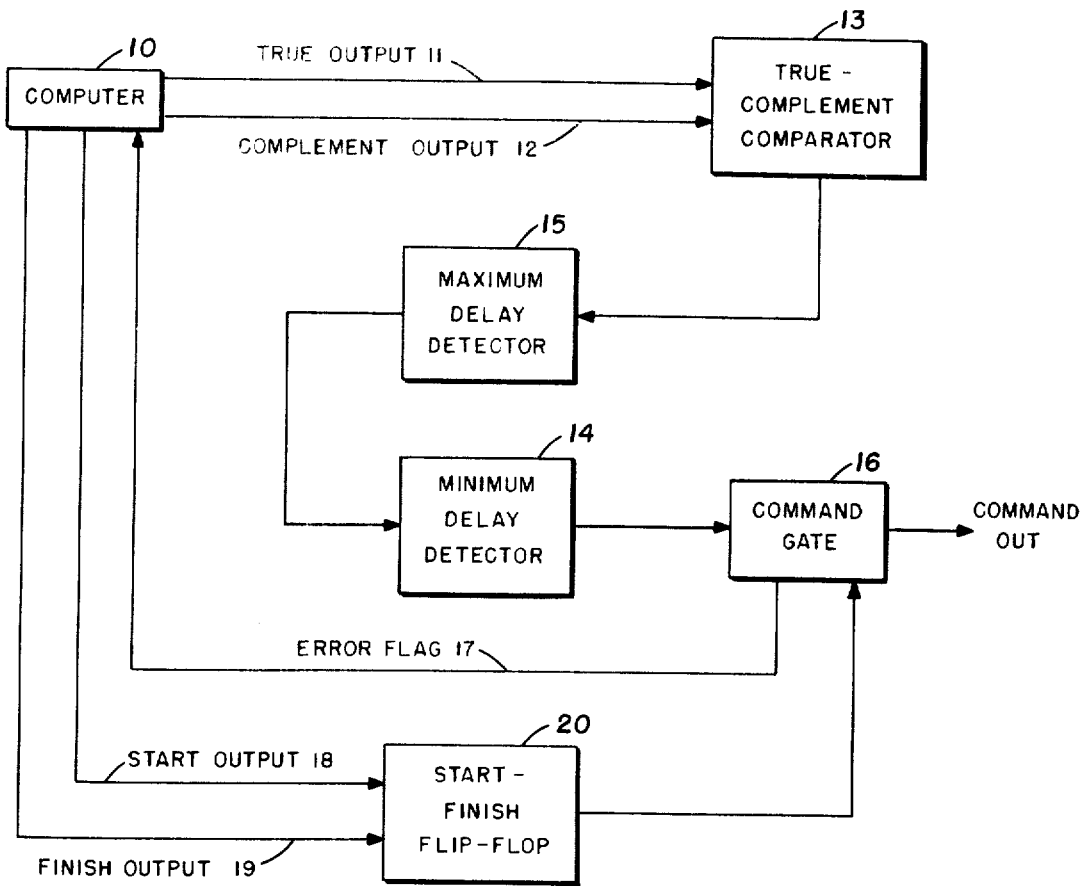
FIG. 1 is a generalized block diagram of the present invention.

Referring now to the generalized block diagram of FIG. 1, a general purpose computer 10 provides, at an output data bus, a pair of data signals corresponding respectively to the true or desired output command, represented at line 11, and the complement of the desired command at line 12. This data, typically in the form of bit streams interlaced in time, are applied to comparator means 13 which performs a bit-by-bit parity check between the true and complement data so as to detect any errors in the format of command data pattern. Additionally, in accordance with the present invention, the output command signal from the computer 10 is applied to timing error detection means which detect errors in the command output relative to predetermined time limits corresponding to the permissible minimum and maximum command intervals of the system, as represented in FIG. 1 by the detector units 14 and 15 respectively.

If, as a result of the dual true-complement check and timing check, no error is detected, the desired output command is then permitted to pass the illustrated command gate unit represented at 16. On the other hand, if an error is detected, of either type, a suitable error flag represented at line 17 is fed back to the computer 10 where it can initiate either a backup operational mode or produce a computer interrupt. As shown in FIG. 1, the computer 10 also generates control signals represented at lines 18 and 19 in the FIG. 1 to control the start and finish respectively of the actual outputting of a desired output command; e.g., by means of a start-finish flip-flop circuit 20 which controls the command gate 16.

Figure 2:
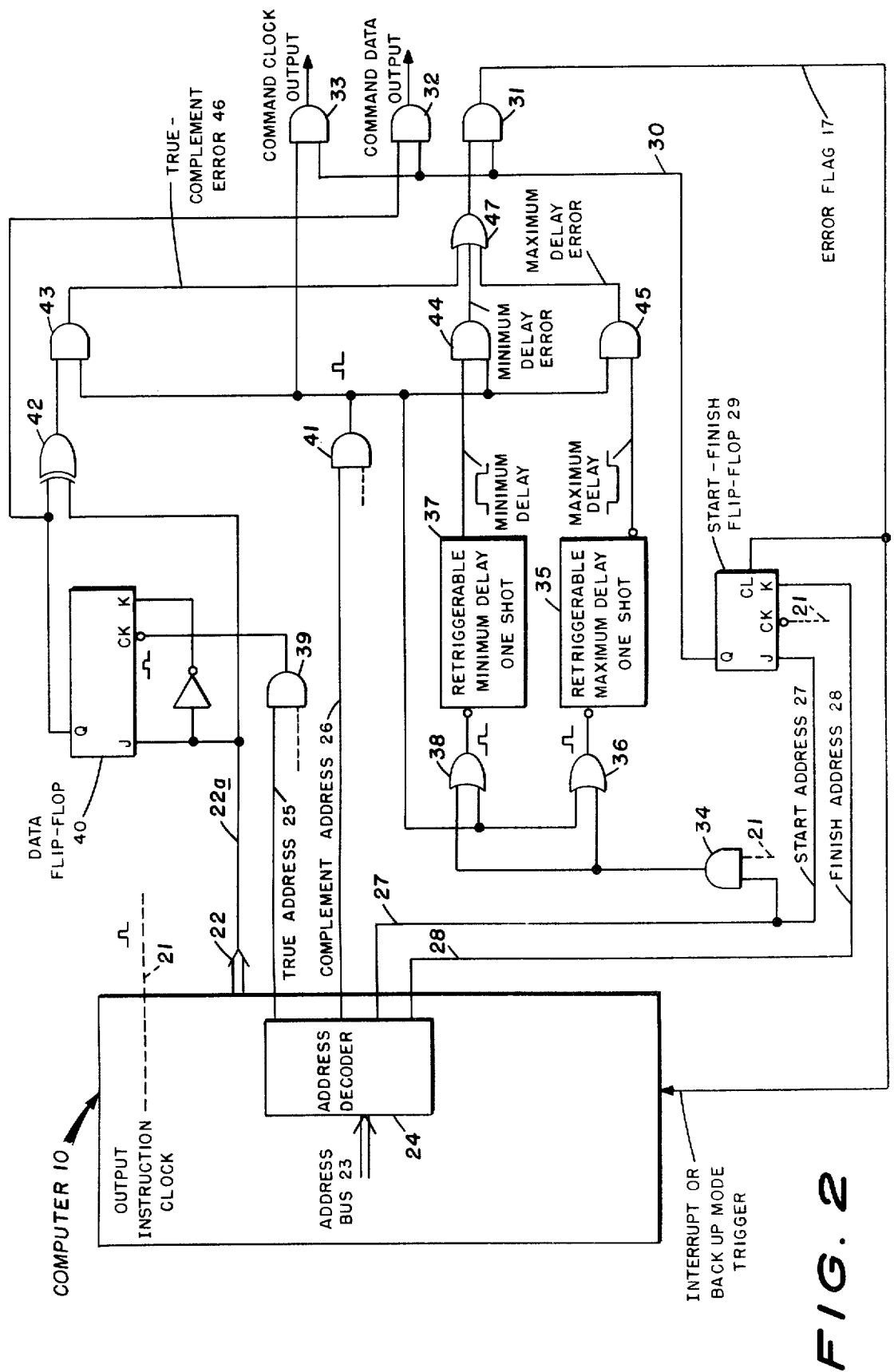
FIG. 2 is a more detailed block diagram of one embodiment of the proposed output controller of the present invention.
Figure 3:
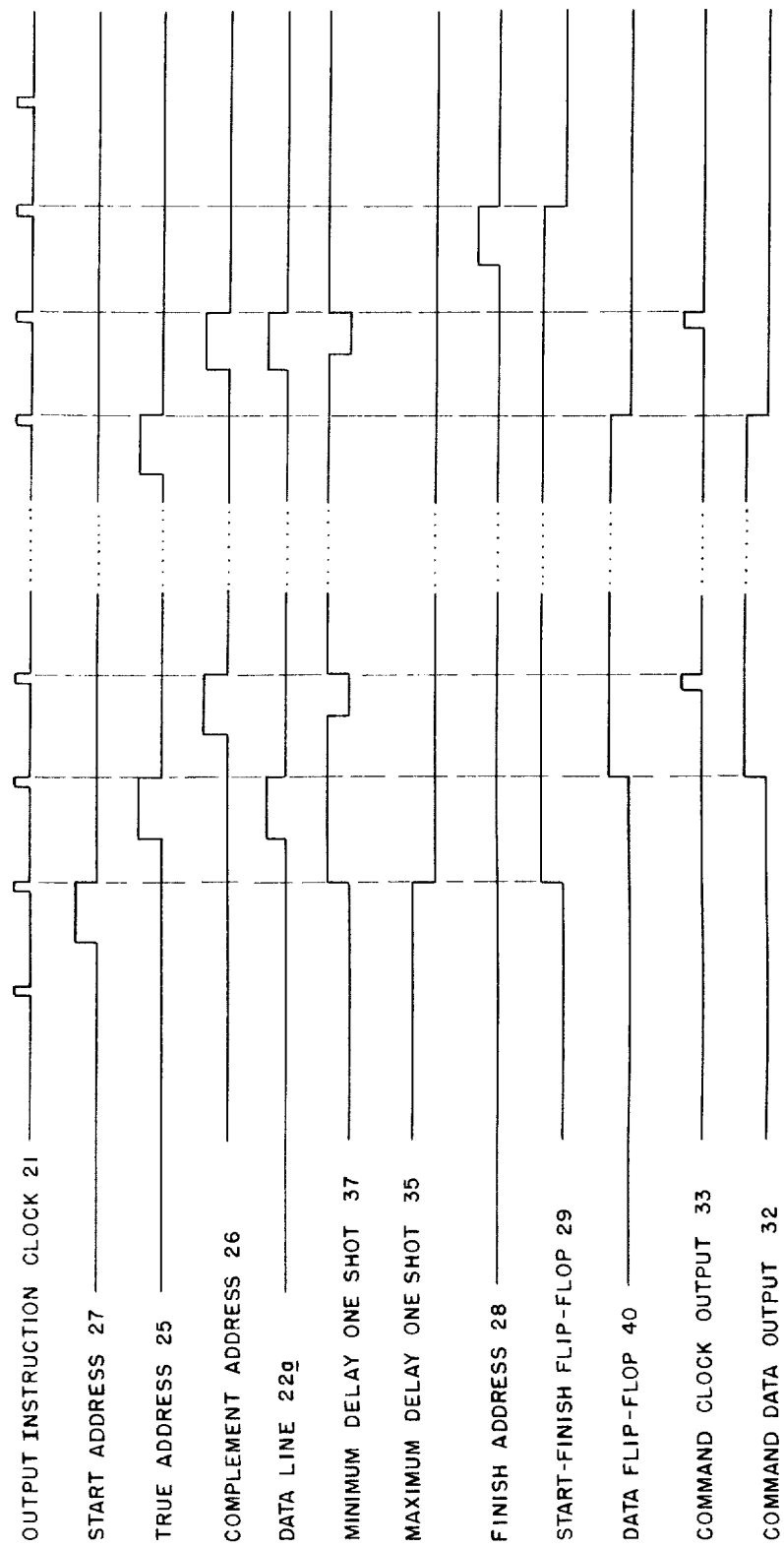
FIG. 3 is a timing diagram associated with the embodiment illustrated in FIG. 2.

A more detailed understanding of the presently preferred embodiment of the present invention may be had by reference to the detailed block diagram of FIG. 2, when considered in connection with the timing diagram of FIG. 3. More particularly, upon executing an output instruction, a computer 10 typically outputs a clock signal 21 which is used by external equipment as a clock strobe. The computer 10 also normally includes a data bus, represented at 22 in FIG. 2, which may typically consist of one or more data lines. One such data line 22a is assigned, in accordance with the present invention, to the proposed command output controller.

In the typical general purpose computer, an address bus 23 is normally decoded into a variety of address or external device control lines by a suitable address decoder 24, well-known to those skilled in the computer arts. As applied to the implementation of output command control, in accordance with the present invention, four different address bus combinations are decoded to provide the following address control signals illustrated in FIG. 2: true address appearing on line 25, complement address appearing at 26, start address appearing at line 27, and stop address appearing at line 28.

At the initiation of a desired output command, the command program software within the computer 10 (not shown) executes an output instruction which gives rise to a start address signal at line 27. This start address signal raises the illustrated J input, or clock synchronous set input, of a start-stop flip-flop circuit designated 29 in FIG. 2, while the output instruction clock pulse applied over line 21 triggers the clock CK input of the start-finish flip-flop 29. The trailing or negative-going edge of this output instruction clock signal 21 sets the start-finish flip-flop 29, thus raising the Q output, line 30, from the start-finish flip-flop 29. This output signal on line 30 from the flip-flop 29 in turn enables each of the illustrated error flag gate 31, the command data output gate 32 and the command clock output gate 33. At the same time, the start address signal appearing at line 27 is gated, by the clock on line 21, through the gate 34 to trigger a retriggerable maximum delay one-shot multivibrator 35, through OR gate 36, and also to trigger the retriggerable minimum delay one-shot 37, through OR gate 38.

The next step in outputting the desired command is for the computer 10 to output the first true data bit onto the data line 22a which is applied to the output controller of the present invention. This is accomplished by an output instruction generating the true address signal on line 25 which, when gated with the output instruction 39, strobes the contents of the data line 22a into the illustrated data flip-flop unit 40. As noted in the timing diagram of FIG. 3, after the outputting of a true data bit to the data flip-flop 40, as just described, a complement address output instruction is executed by the computer 10 and during such execution, the complement address line 26 is raised and gated with the output instruction clock 21, at gate 41. At the same time, the data output line 22a, which should now contain the complement command data bit, undergoes an exclusive OR logic comparison with the contents of the data flip-flop 40, by means of exclusive OR gate 42.

As seen in FIG. 2, the gated complement address output instruction appearing at the output of gate 41 enables three separate gate circuits; namely, a true-complement error gate 43, a minimum delay error gate 44 and a maximum delay error gate 45. Accordingly, if at this time the data line 22a does not contain the complement of the data bit previously stored in the data flip-flop 40, a true-complement error signal will appear at line 46 at the output of the gate 43. On the other hand, if the complement address output instruction, timed from the execution of the start address instruction (see FIG. 3), is less than the minimum delay one-shot time, a minimum delay error signal will be generated at the output of gate 44; whereas, if the complement address output instruction, timed from the execution of the start address instruction, is greater than the maximum delay one-shot time, a maximum delay error signal will be generated at the output of the gate 45.

As shown in FIG. 3, the trailing edge of the complement data address signal appearing at the output of gate 41, retriggers the minimum delay one-shot 37, through OR gate 38 (see FIG. 2), and the maximum delay one-shot 35, through OR gate 36. The maximum delay one-shot output will normally already be in the triggered state and a new maximum delay time interval will begin without interruption of its triggered state. Subsequently clocked complement data signal pulses at the output of the gate 41 must also occur between the minimum delay interval timed by the one-shot 37 and the maximum delay interval timed by the one-shot 35, in order to prevent an error signal appearing respectively at the outputs of gates 44 and 45.

As shown in FIG. 2, the outputs of the three error gates 43, 44 and 45, are applied to the logical OR gate 47, whose output is applied as input to the error flag gate 31 which, as previously pointed out, is gated by the output of the start-finish flip-flop circuit 29. An error flag signal appearing at the output of the error flag gate 31 will directly clear the start-finish flip-flop preventing further command outputting and is also applied back to the computer 10, as noted earlier, in order to interrupt the computer operation and/or to trigger a suitable back-up mode of operation.

During normal operation, a serial data bit stream from the command data gate 32 and clock timing strobes from the command clock gate 33 will output the desired command to the external device being controlled by the computer system. As indicated in the timing diagram of FIG. 3, the command output clock from gate 33 occurs at the time of a complement address data bit output instruction. At the completion of a command output data sequence, a finish output address instruction from the computer raises the finish address line 28 and clears the start-stop flip-flop 29, thus terminating the output command interval.

In view of the foregoing discussion, it will be seen that in accordance with the present invention an output controller is provided by which a general purpose computer is prevented from outputting undesired or improper commands. Thus, the proposed output controller will greatly facilitate the utility and acceptability of the general purpose computer as a means for automatically controlling the initiation of delayed and/or conditional commands; e.g., in such applications as onboard a spacecraft.

Various modifications, adaptations and alterations of the present invention are of course possible in light of the above teachings. It should therefore be understood at this time that, within the scope of the appended claims, the invention may be practiced otherwise than as specifically described hereinabove.

What is claimed is:

1. A command controller for a computer system comprising, in combination, a computer means for outputting a data signal corresponding to each desired command, comparator means responsive to said data output signal for detecting data errors within said data signal, timing error detecting means for checking said data signal corresponding to the desired command output for timing errors relative to a pair of preselected time limits corresponding respectively to minimum and maximum permitted times within said computer system for outputting of a command, said computer means further generating a signal means demarcating the desired beginning and ending time limits for said desired output command, and means responsive to said comparator means and said timing error detecting means for generating an error flag signal fed back to said computer means if a data or timing error is detected for said command output signal from said computer means.

2. The combination specified in claim 1 wherein said computer means generates a command signal demarcating the intended start of a command output and wherein said timing error detecting means includes first and second multivibrator means each responsive to the start command signal generated by said computer means for respectively generating signals defining minimum and maximum time intervals during which said desired command signal should be outputted.

3. The combination specified in claim 1 wherein said error flag signal fed back to said computer means is utilized to control operation of said computer means.

4. The combination specified in claim 1 wherein said data signal comprises a pair of complementary multi-bit signals corresponding respectively to the true or desired command signal and the complement of said desired command signal, and wherein said comparator means comprises means for performing a bit-by-bit parity check between the true and complement multi-bit signals.

5. The combination specified in claim 4 wherein each data bit and its complementary bit occur in succession within said data signal and wherein said comparator means includes an exclusive OR logic circuit means operably connected to determine if in fact each data bit is followed by its complement bit.

6. The combination specified in claim 1 wherein said error flag signal producing means comprises an OR logic circuit means operably connected to said data signal error detecting means and said timing error detecting means.

* * * * *